United States Patent [19]

Payne

[11] 3,765,074
[45] Oct. 16, 1973

[54] SLEEVE HOLDER FOR TOOLS
[75] Inventor: Leroy C. Payne, La Habra, Calif.
[73] Assignee: Standard Pneumatic Motor Company, Whittier, Calif.
[22] Filed: Oct. 26, 1971
[21] Appl. No.: 192,472

[52] U.S. Cl. ............................................. 29/203
[51] Int. Cl. ........................... H01r 43/04
[58] Field of Search ................... 29/203 H, 203 D, 29/203 R, 200 H

[56] References Cited
UNITED STATES PATENTS
2,734,260  2/1956  Wyckoff .................. 29/203 H X
3,624,888  12/1971  Kester ....................... 29/203 H Primary Examiner—Thomas H. Eager
Attorney—J. Carroll Baisch

[57] ABSTRACT

Apparatus for securing indexing sleeves for the bits of wire-wrapping tools wherein there is a sleeve holder having a bore that flares at its forward end. A resilient split-plastic insert has its inner end tapered, the tapered end being received in the flared part of the sleeve holder. The insert is removably held at the outer end of the sleeve nut which, when rotated in one direction, exerts longitudinal pressure against the end of the insert opposite the tapered end to effect traction of the insert so as to hold the sleeve in position. Rotation of the sleeve nut in the opposite direction allows the insert to expand and release the sleeve. The sleeve has a longitudinally-extending slot in the inner end into which a key of the sleeve holder is slidably received to prevent rotation of the sleeve.

5 Claims, 5 Drawing Figures

Patented Oct. 16, 1973

3,765,074

LeRoy C. Payne
INVENTOR.

BY J.C. Barsch
Attorney

{ 3,765,074 }

SLEEVE HOLDER FOR TOOLS

BACKGROUND OF THE INVENTION

1. Field of the Invention

This invention relates generally to means for holding parts of tools in operative position and relates more particularly to devices for securing indexing sleeves of wire-wrapping tools in operative position.

2. Description of the Prior Art

Prior-art sleeve holders, of which I am aware, have an externally-threaded outer end portion for the threaded reception of a sleeve nut of a chuck which includes jaws actuated by the sleeve nut tightening or loosening the jaws. This arrangement is relatively complicated and expensive to manufacture and is susceptible to damage if the tool is accidentally dropped.

SUMMARY OF THE INVENTION

The present invention includes a sleeve holder into and out of which an indexing sleeve of a wire-wrapping tool is slidable. The sleeve has a longitudinally-extending slot in one end into which an interior key of a sleeve holder is slidably received and which prevents rotation of the sleeve when the latter is in operative position. The forward end of the sleeve holder flares from an axial bore thereof and there is an external part of said sleeve holder that is externally threaded for threadable reception of a sleeve nut.

In the forward end portion of the sleeve nut a resilient, longitudinally-slotted insert is held and movable with the nut. The insert has a longitudinal bore therethrough which is axially aligned with the bore of the sleeve holder. At its inner end, the insert is tapered for reception in the flared part of the forward end of the sleeve holder so that inward longitudinal pressure will cause the insert to be contracted onto a sleeve within said insert and sleeve holder. The insert is so held in the sleeve nut as to be forced against the adjacent end of the sleeve holder when the nut is rotated in one direction and contract the insert on the sleeve to hold said sleeve in operative position. The insert is moved away from the adjacent end of the sleeve holder when the nut is rotated in the opposite direction to release the sleeve from the insert.

OBJECTS AND ADVANTAGES OF THE INVENTION

It is, therefore, an object of the invention to provide sleeve-holder means that may be easily operated.

It is another object of the invention to provide sleeve-holding means for wire-wrapping tools that may be easily tightened without the use of wrenches and the like.

It is still another object of the invention to provide means of this character that is inexpensive to manufacture and easy to install.

It is a further object of the invention to provide sleeve-holding means that includes a split, resilient plastic collet.

A still further object of the invention is to provide means of this character that is less likely to be damaged if the tool is accidentally dropped.

Another object of the invention is to provide a collet that is locked into the sleeve nut to prevent the collet or insert from dropping out and being lost when the sleeve nut is removed.

The characteristics and advantages of the invention are further sufficiently referred to in connection with the accompanying drawings, which represent one embodiment. After considering this example, skilled persons will understand that variations may be made without departing from the principles disclosed and I contemplate the employment of any structures, arrangements or modes of operation that are properly within the scope of the appended claims.

BRIEF DESCRIPTION OF THE DRAWINGS

Referring to the drawings, which are for illustrative purposes only.

DESCRIPTION OF THE PREFERRED EMBODIMENT

Figure 1:
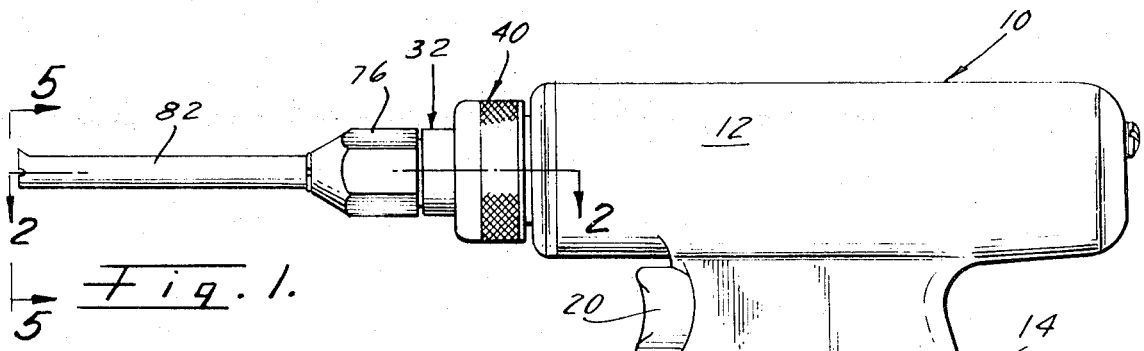
FIG. 1 is a side-elevational view of a wire-wrapping tool embodying the present invention.
Figure 4:
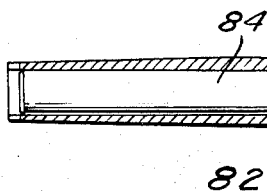
FIG. 4 is a perspective view of the insert or collet.
Figure 5:
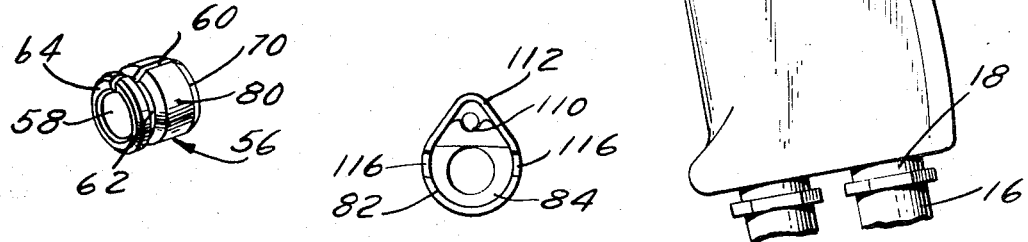
FIG. 5 is an end view taken on line 5—5 of FIG. 1 showing the forward end of the bit and sleeve of the invention.
Figure 2:
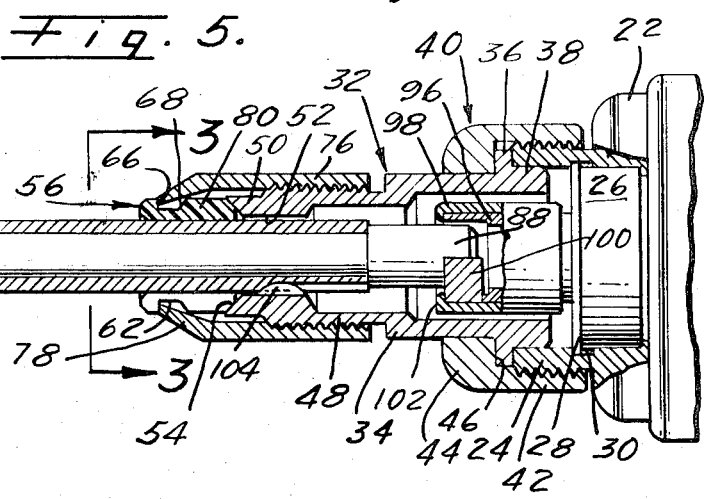
FIG. 2 is a sectional view taken on line 2—2 of FIG. 1.
Figure 3:
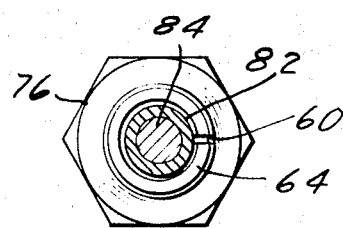
FIG. 3 is a sectional view taken on line 3—3 of FIG. 2.

Referring more particularly to the drawings, there is shown a wire-wrapping tool, indicated generally at 10. The tool has a housing with a part 12 from which a handle 14 depends. Within the housing is a pneumatic motor, not shown, which is driven by air under pressure supplied to the tool from a suitable source of such air under pressure. The source of pressured air is connected by means of a flexible conduit 16 with the tool through an inlet bushing 18. An operating button 20 controls a valve which controls the supply of pressured air to the pneumatic motor. At the front end of the housing part 12 there is an adapter 22 which includes a forwardly-projecting tubular part 24 that is externally threaded.

Within the adapter there is a roller bearing 26 which is held in position by means of a retaining ring 28 of the usual well-known character and which is disposed in an internal groove 30 in the forward portion of said adapter.

There is a sleeve holder, indicated generally at 32, having a body 34. Adjacent the rear end of the body 34 said body has a radial flange 36 and there is a rear portion 38 of the body rearwardly of the flange 36 that is disposed within the forward end of the part 24 of the adapter. A collet nut 40 having an inner tapped portion 42 is threadably disposed on the external threads of the part 24 of the adapter. The outer end 44 of the collet nut 40 has an opening through which the body 34 extends, and an interior shoulder 46 of said collet nut engages the forward or outer side of the flange 36 and clamps said flange against the forward end of the part 24 of the adapter.

Sleeve holder 32 has a hollow forward extension 48 that is externally threaded and which terminates in an end portion 50 with a bore 52 which flares at its outer end, as indicated at 54, and which serves as a cam for an insert or collet, indicated generally at 56.

Insert or collet 56 has an axial bore 58 therethrough and said collet is longitudinally split, as indicated at 60. Adjacent its forward end, said collet has an annular groove 62, at the forward end of which is an annular flange 64. The forward wall 66 of the groove 62 is normal to the axis of the insert or collet while the rear wall 68 of said groove is inclined outwardly and rearwardly, or inwardly. At its rear or inner end the insert or collet is beveled, as at 70, and this beveled end portion is adapted to abut against the flaring forward end portion 54 of the extension 48. Means for operating the collet or insert 56 comprises a sleeve nut 76, a rear end portion of said sleeve nut being tapped and threadably disposed on the threaded part of the extension 48. At its outer or forward end sleeve nut 76 tapers forwardly at 78 and an end portion thereof is disposed in the groove 62 with the forward end engaging or abutting against the side 66 of said groove. At the inner end of groove 62 the tapered part 78 of the sleeve nut engages the main body 80 of the insert which is thus held securely in the forward end of the sleeve nut so that said insert will be forced against the forward end of the extension of the sleeve holder and be contracted as the sleeve nut is tightened. Contraction of the insert or collet will clamp the same onto a bit sleeve 82 disposed therein. Reverse movement of the sleeve will, of course, cause the insert or collet to be moved away from the adjacent end of the extension of the sleeve holder.

The insert or collet 56 may be of any suitable material but plastic has been found to be vary satisfactory. The material is resilient and one such material is acetal plastic.

Within the bit sleeve 82 is rotatably disposed a bit 84 which extends rearwardly of the rear end of the sleeve and which has an enlarged part 86, the forward end of which abuts the rear end of the sleeve 82. The enlarged part 86 has a rear end portion 88 that is semi-circular in cross section.

The motor shaft extends through the bearing 26 and is operably connected to the spindle sleeve 96 by any suitable means such as a detent arrangement, not shown, or a pin, for example. The spindle sleeve is disposed within a retainer 98 that has a tubular forward end portion that has a forward end part that is semi-circular to provide space for a semi-circular drive 100 that fits into the notch defined by the semi-circular part 88 and the adjacent end of the part 86 of the bit. The spindle sleeve 96 and the driver 100 are disposed within the spindle sleeve retainer and are held in position by an inturned annular flange 102 at the forward end of said spindle sleeve retainer.

When the bit 84 is in operative position the driver 102 is disposed in the notch at the inner end of the enlarged part 86 of said bit. The forward or outer end of the enlarged part 86 of the bit is in abutment with the inner end of the bit sleeve and when the bit sleeve is secured in operative position the bit is operably held against longitudinal movement.

The bit sleeve is held against rotation by a key 104 within the part 50 of the extension 48 of the sleeve holder 32, said key being disposed in a longitudinally-extending slot 106 in the inner end of the bit sleeve.

The bit 84 has a groove 110 extending longitudinally from the front or forward end thereof and the forward end of the bit sleeve 82 has a forwardly-flared portion 112 at the top side thereof to facilitate insertion of wires into the groove 110 of the bit. The forward end of the bit sleeve also has notches 116 therein for reception of the wire to be wrapped in the well-known manner.

Thus, the bit sleeve will be securely held in operative position for registration with the groove 110 of the bit and said bit sleeve will also hold the bit against longitudinal movement.

The invention and its attendant advantages will be understood from the foregoing description and it will be apparent that various changes may be made in the form, construction and arrangement of the parts of the invention without departing from the spirit and scope thereof or sacrificing its material advantages, the arrangement hereinbefore described being merely by way of example, and I do not wish to be restricted to the specific form shown or uses mentioned, except as defined in the accompanying claims.

I claim:

1. A bit sleeve holder for the bits of wire wrapping tools to wrap wire having means for rotating the bit, comprising:
   A. a holder for bit sleeves, said holder being for attachment to bit-rotating means, said holder having an externally-threaded part and a forward end with an axial bore for reception of a bit sleeve, said bore flaring forwardly;
   B. a sleeve nut threadably disposed on the threaded part of said holder, said sleeve nut being a tapered front end portion;
   C. and a resilient, annular, longitudinally-split collet, the edges defining the split being annularly spaced apart, said collet having an annular groove therein intermediate its ends, the rear end of said collet being tapered for engagement with the flared end of the bore of the holder, the tapered end part of said sleeve nut being disposed in the groove of the collet for holding said collet and effecting longitudinal movements thereof with corresponding movements of said sleeve nut, rotation of said sleeve nut in one direction causing the collet to engage and be forced against the flared part of the bore of the holder to effect contraction of said collet, and movement of the sleeve nut in the opposite direction effecting relief of said pressure to allow the collet to expand.

2. Clamping means comprising:
   A. a longitudinally split, annular collet, the edges defining the split being annularly spaced apart;
      whereby said edges may be forced to a desired spacing, thus producing desired clamping and unclamping actions;
   B. a tapered portion at one end of said collet;
      whereby said tapered portion serves as means for forcing said edges to a desired spacing;
   C. said collet having an annular groove intermediate its ends;
      whereby said annular groove is adapted to provide a force for producing said clamping and unclamping actions;

3. The invention defined by Claim 2, wherein the groove is adjacent the end of the collet opposite the tapered end, the groove wall at one side being normal to the axis of the collet, the other wall of the groove being inclined outwardly and toward the tapered end;
      whereby one wall of said groove functions to provide said clamping action, and the other wall of said groove functions to provide said unclamping action.

4. The invention defined by Claim 2, including a sleeve nut having a portion thereof tapped, a portion of one end being tapered and an end part of the tapered portion being disposed in the groove of the collet;

whereby said end portion of said sleeve-nut and said groove coact to initiate said clamping and unclamping actions.

5. The invention defined by Claim 3, in combination with a sleeve nut having a rear end portion tapped, a portion of its forward end being tapered with an end portion thereof disposed in the groove of the collet, the forward end of said sleeve nut engaging the groove wall that is normal to the axis of the collet, the tapered part of the sleeve nut engaging the collet body at the outer part of the wall of the groove that is inclined outwardly and toward the tapered end of the collet;

whereby movement in a given direction of said sleeve-nut along its tapped rear-end portion causes said tapered part of the sleeve nut to engage said tapered groove wall of said collet body, and to produce said clamping action; and movement in the opposite direction of said sleeve nut along its tapped rear-end portion causes said forward end of said sleeve-nut to engage the normal groove-wall, and to produce said unclamping action.

* * * * *